(12) United States Patent
Wu

(10) Patent No.: US 11,530,693 B1
(45) Date of Patent: Dec. 20, 2022

(54) INFLATING DEVICE

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 5 days.

(21) Appl. No.: 17/350,085

(22) Filed: Jun. 17, 2021

(51) Int. Cl.
  *F04B 33/00* (2006.01)
  *F04B 39/12* (2006.01)
  *B60S 5/04* (2006.01)
  *F16K 15/20* (2006.01)

(52) U.S. Cl.
  CPC .......... *F04B 33/005* (2013.01); *F04B 39/123* (2013.01); *B60S 5/04* (2013.01); *F16K 15/20* (2013.01); *Y10T 137/3584* (2015.04); *Y10T 137/3724* (2015.04)

(58) Field of Classification Search
  CPC ........ F04B 33/005; F04B 39/123; B60S 5/04; Y10T 137/3724; Y10T 137/3584; B05B 9/0426; B60C 29/00–06; F16K 15/20
  USPC ..................... 137/223, 231; 152/415; 141/38; 417/374, 367, 440, 510, 511
  See application file for complete search history.

(56) References Cited

U.S. PATENT DOCUMENTS

| | | | | |
|---|---|---|---|---|
| 1,253,976 A | * | 1/1918 | Hughes | F04B 33/005 92/144 |
| 1,323,168 A | * | 11/1919 | De Rigne | F04B 33/005 417/547 |
| 1,335,718 A | * | 4/1920 | Austin | F04B 33/005 92/244 |
| 1,357,544 A | * | 11/1920 | Culp | F04B 39/0016 137/533.13 |
| 1,476,600 A | * | 12/1923 | Dickens | F04B 33/005 92/151 |
| 1,596,356 A | * | 8/1926 | Hughes | F04B 33/005 92/194 |
| 8,360,090 B2 | * | 1/2013 | Wang | F16K 11/056 137/119.06 |
| 8,402,987 B2 | * | 3/2013 | Wang | B60S 5/043 251/149.1 |
| 11,209,091 B2 | * | 12/2021 | Wu | F16K 15/207 |
| 2003/0156950 A1 | * | 8/2003 | Ostrowiecki | B62J 11/02 417/469 |
| 2004/0086404 A1 | * | 5/2004 | Wu | F04B 33/005 417/440 |
| 2004/0156726 A1 | * | 8/2004 | Wu | F04B 33/005 417/469 |

(Continued)

*Primary Examiner* — Craig J Price
(74) *Attorney, Agent, or Firm* — Alan D. Kamrath; Karin L. Williams; Mayer & Williams PC

(57) ABSTRACT

An inflating device includes an air pump, a valve engaging head, and a pushing apparatus disposed on the air pump and selectively engaging and disengaging the valve engaging head. The valve engaging head includes a main body, a connection assembly coupled to the main body and having a connection hole for a Presta valve and another connection hole for a Schrader valve, and a valve seat movably disposed in the main body. The connection assembly has a receiving hole and the valve seat is movably disposed in the receiving hole. The pushing apparatus selectively contacts and disengages from the connection assembly. The pushing apparatus has a pushing portion adapted to drive the valve seat. The pushing apparatus engaging the valve engaging head includes the pushing portion pushing the first abutting portion, thereby driving the valve seat toward the second connection hole.

20 Claims, 8 Drawing Sheets

(56) References Cited

U.S. PATENT DOCUMENTS

| | | | |
|---|---|---|---|
| 2006/0159575 A1* | 7/2006 | Wu | F04B 33/005 417/572 |
| 2008/0179879 A1* | 7/2008 | Wu | F16L 27/04 285/148.1 |
| 2008/0181799 A1* | 7/2008 | Wu | F04B 33/005 417/455 |
| 2012/0234401 A1* | 9/2012 | Wu | F16L 37/00 137/231 |
| 2013/0028756 A1* | 1/2013 | Wang | F04B 33/005 417/234 |
| 2013/0071264 A1* | 3/2013 | Wang | F04B 33/005 417/234 |
| 2013/0186490 A1* | 7/2013 | Wu | F04B 33/005 137/613 |
| 2013/0186979 A1* | 7/2013 | Wu | F04B 33/005 239/268 |
| 2017/0122452 A1* | 5/2017 | Wang | F04B 33/005 |

\* cited by examiner

INFLATING DEVICE

BACKGROUND OF THE INVENTION

1. Field of the Invention

The present invention relates to an inflating device and, particularly, to an inflating device for pumping Schrader and Presta valves.

2. Description of the Related Art

A valve in a tire is a discrete valve. When the valve is pumped, it opens and air enters the valve, and then automatically closes and seals the tire to prevent air from escaping from the tire. Conventional common valves include two types of different structures: Schrader valve and Presta valve. The Schrader valve is most widely used, which is commonly found on automobiles, motorcycles, bicycles and other vehicles. The Presta valve is commonly found on bicycles, especially on racing bikes. Since the Schrader and Presta valves have different outer diameters and structures, the ways they are connected with an inflating device are different. Accordingly, a dual-purpose air valve connector is available on the market. Such dual-purpose air valve connector has one connection hole at one end for connecting with a Schrader valve and another connection hole at another end for connecting with a Presta valve. Moreover, the dual-purpose air valve connector has a lever configured to cause a gasket, which forms the connection holes, to selectively connecting with a Schrader valve and a Presta valve. However, it is inconvenient to use such gasket for selectively connecting with a Schrader valve and a Presta valve. Further, the gasket easily becomes loose and thus can not tightly engage with a valve.

The present invention is, therefore, intended to obviate or at least alleviate the problems encountered in the prior art.

SUMMARY OF THE INVENTION

According to the present invention, an inflating device includes an air pump, a valve engaging head for engaging with a valve to be pumped intercommunicating with the air pump, and a pushing apparatus disposed on the air pump 1 and selectively engaging and disengaging the valve engaging head. The air pump includes a cylinder, a plunger movably disposed in the cylinder and being reciprocally movable with respect thereto, and an air tube connected with the cylinder. The valve engaging head includes a main body, a connection assembly coupled to the main body and having a first connection hole for connecting with a Presta valve and a second connection hole for connecting with a Schrader valve, and a valve seat movably disposed in the main body and having a first abutting portion against which a lock nut of the Presta valve abuts and a second abutting portion against which a valve core of the Schrader valve abuts. The main body forms a head portion having a hole and the connection assembly is rotatably inserted in the hole. The main body forms a body portion extending from the head portion and having a through hole which extends therein and intercommunicates with the hole and the air tube. The connection assembly has a receiving hole and the valve seat is movably disposed in the receiving hole. The receiving hole intercommunicates with the first and second connection holes. The pushing apparatus selectively contacts and disengages from the connection assembly. The pushing apparatus has a pushing portion adapted to drive the valve seat. The pushing apparatus engaging the valve engaging head includes the pushing portion entering the receiving hole via the first connection hole and pushing the first abutting portion, thereby driving the valve seat toward the second connection hole.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing other structures, methods and systems for carrying out the several purposes of the present invention. It is important, therefore, that the claims be regarded as including such equivalent constructions insofar as they do not depart from the spirit and scope of the present invention.

Further, the purpose of the abstract is to enable the public generally, and especially scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
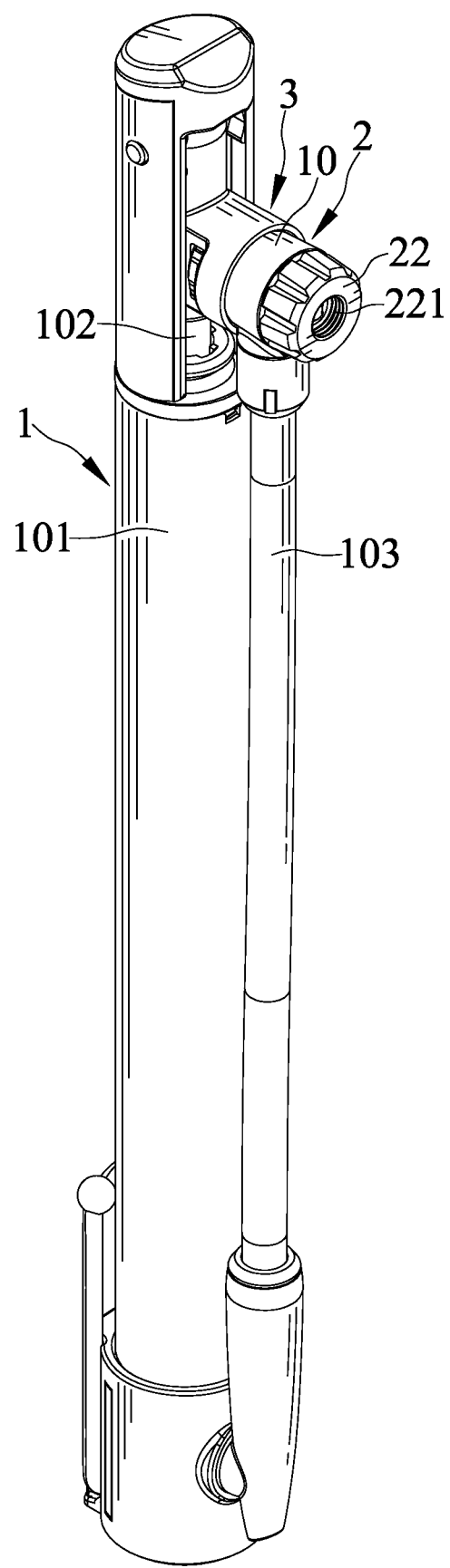
FIG. 1 is a perspective view of an inflating device in accordance with a first embodiment of the present invention.
Figure 2:
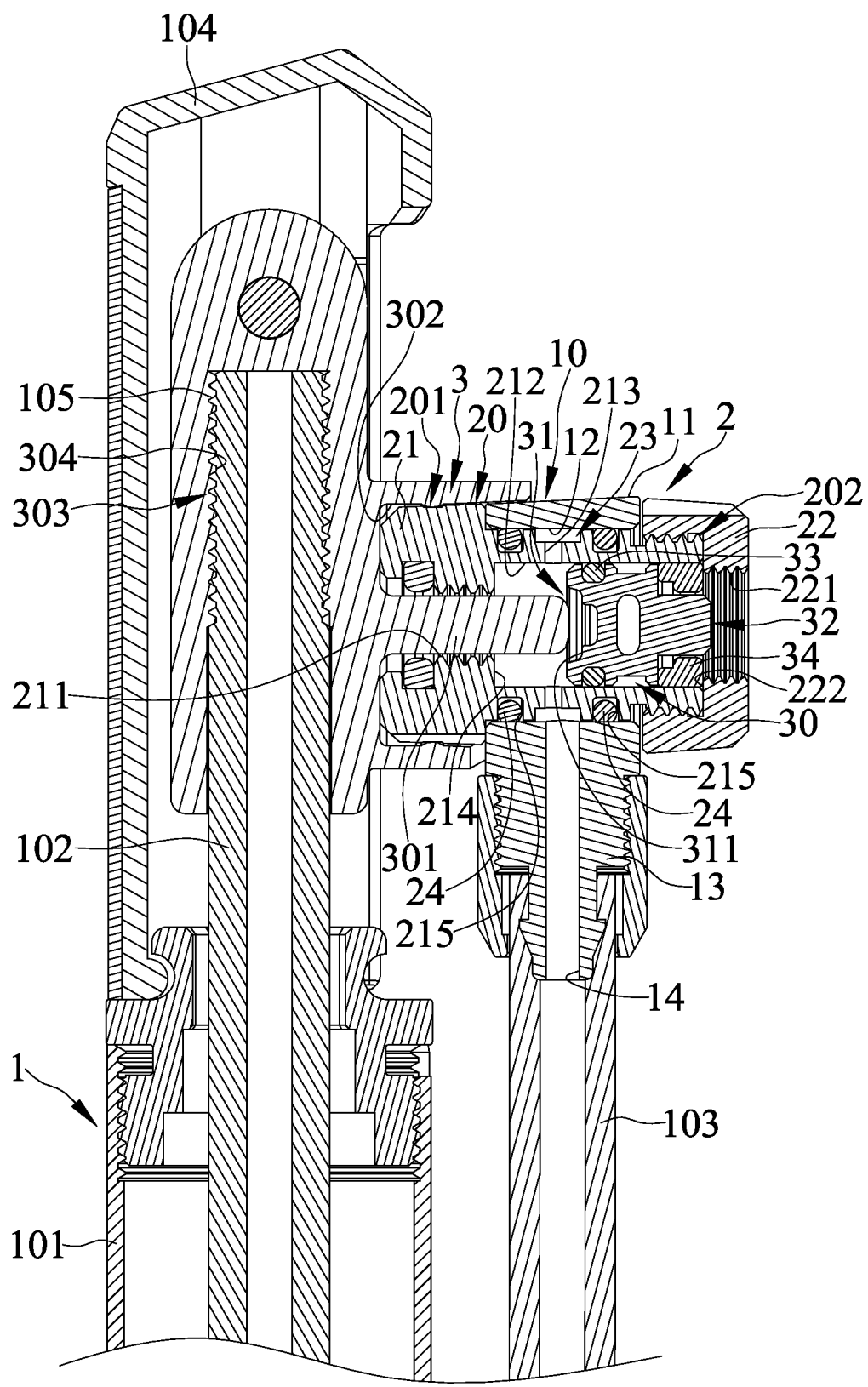
FIG. 2 is a partial, cross-sectional view of FIG. 1.

FIGS. 1 and 2 show an inflating device in accordance with a first embodiment of the present invention. The inflating device is adapted to pump Schrader and Presta valves.

The inflating device includes an air pump 1, a valve engaging head 2 for engaging with a valve, i.e. a Schrader valve or a Presta valve to be pumped intercommunicating with the air pump 1, and a pushing apparatus 3 disposed on the air pump 1 and selectively engaging and disengaging the valve engaging head 2.

The air pump 1 includes a cylinder 101, a plunger 102 movably disposed in the cylinder 101 and being reciprocally movable with respect thereto, and an air tube 103 connected with the cylinder 101.

The valve engaging head 2 includes a main body 10 which forms a head portion 11 and a body portion 13. The body portion 13 extends from the head portion 11 and has a through hole 14 which extends therein and intercommunicates with a hole 12 of the head portion 11 and the air tube 103. The hole 12 extends axially in the head portion 11.

The valve engaging head 2 includes a connection assembly 20 coupled to the main body 10 and rotatably inserted in the hole 12. The connection assembly 20 includes a first connection member 21 and a second connection member 22 connected with the first connection member 21. The first and the second connection members 21 and 22 are releasably engaged with each other. The first and the second connection members 21 and 22 are in thread engagement.

The first connection member 21 has a first connection hole 211 and a receiving hole 212 extending therein. The first connection hole 211 is adapted to connect with a Presta valve. The first connection member 21 has a large diameter section 201 and a small diameter section 202. The large diameter section 201 is disposed outside the hole 12. The small diameter section 202 extends through the hole 12. The first connection hole 211 extends in the large diameter section 201. The receiving hole 212 extends in the small diameter section 202. The first connection member 21 has a first shoulder 214 which delimits a distal end of the receiving hole 212 and extends radially between inner peripheries of the receiving hole 212 and the first connection hole 211.

The first connection member 21 includes two seal rings 24 mounted therearound and abutting against the inner periphery of the hole 12. The first connection member 21 has two annular grooves 215 retaining the two seal rings 24. The two annular grooves 215 extend between the inner periphery of the hole 12 and the outer periphery of the first connection member 21.

The connection assembly 20 has an air passage 23 which extends between an inner periphery of the hole 12 and an outer periphery of the first connection member 21. The air passage 23 is disposed between the two annular grooves 215. The first connection member 21 has an air vent 213 which extends radially therethrough and intercommunicates with the air passage 23. The air vent 213 intercommunicates the through hole 14.

The second connection member 22 has a second connection hole 221 extending therein. The second connection hole 221 is adapted to connect with a Schrader valve. The second connection member 22 has a second shoulder 222 which extends radially and abuts against a distal end of the first connection member 21. The second connection member 22 is mounted on the small diameter section 202 of the first connection member 21. The receiving hole 212 intercommunicates with the first and second connection holes 211 and 221.

The valve engaging head 2 includes a valve seat 30 movably disposed in the main body 10. The valve seat 30 is movably disposed in the receiving hole 212. The valve seat 30 has a first abutting portion 31 against which a lock nut of the Presta valve abuts (not shown) and a second abutting portion 32 against which a valve core of the Schrader valve abuts (not shown). The valve seat 30 is movable to a first position in which the first abutting portion 31 abuts against the first shoulder 214 and a second position in which an airtight sleeve 34 abuts against the second shoulder 222. The airtight sleeve 34 is mounted around the second abutting portion 32 and abuts against the inner periphery of the receiving hole 212. The valve seat 30 has an outer periphery including an airtight ring 33 mounted thereon. The airtight ring 33 abuts against an inner periphery of the receiving hole 212. The airtight ring 33 is located between the air vent 213 and the second connection hole 221 when the valve seat 30 is disposed adjacent to the second connection hole 221. The airtight ring 33 is located between the air vent 213 and the first connection hole 211 when a Schrader valve is connected with the second connection hole 221 (not shown).

The pushing apparatus 3 selectively contacts and disengages from the connection assembly 20. The pushing apparatus 3 has a pushing portion 301 adapted to drive the valve seat 30. The pushing apparatus 3 engaging with the valve engaging head 2 includes the pushing portion 301 entering the receiving hole 212 via the first connection hole 211 and pushing the first abutting portion 31, thereby driving the valve seat 30 toward the second connection hole 221.

The pushing apparatus 3 delimits a holding space 302 in which the valve engaging head 2 is selectively inserted. The pushing portion 301 extends in the holding space 302. The pushing portion 301 extends from an inner periphery of the holding space 302. The pushing portion 301 extends outside the holding space 302.

The pushing apparatus 3 is coupled to the plunger 102. The pushing apparatus 3 has a connecting portion 303 connecting with the plunger 102. The connecting portion 303 and the plunger 102 are in thread engagement. The connecting portion 303 has a hole 304 with threads and the plunger 102 has threads 105 engaged with the threads of the hole 304. The pushing apparatus 3 is partially disposed in the cylinder 101. The pushing apparatus 3 is also coupled to a handle 104 of the air pump 1 that is adapted to be gripped and moved reciprocally with the plunger 102 upon the operation of the air pump 1. The handle 104 is pivotally coupled to the pushing apparatus 3.

Figure 3:
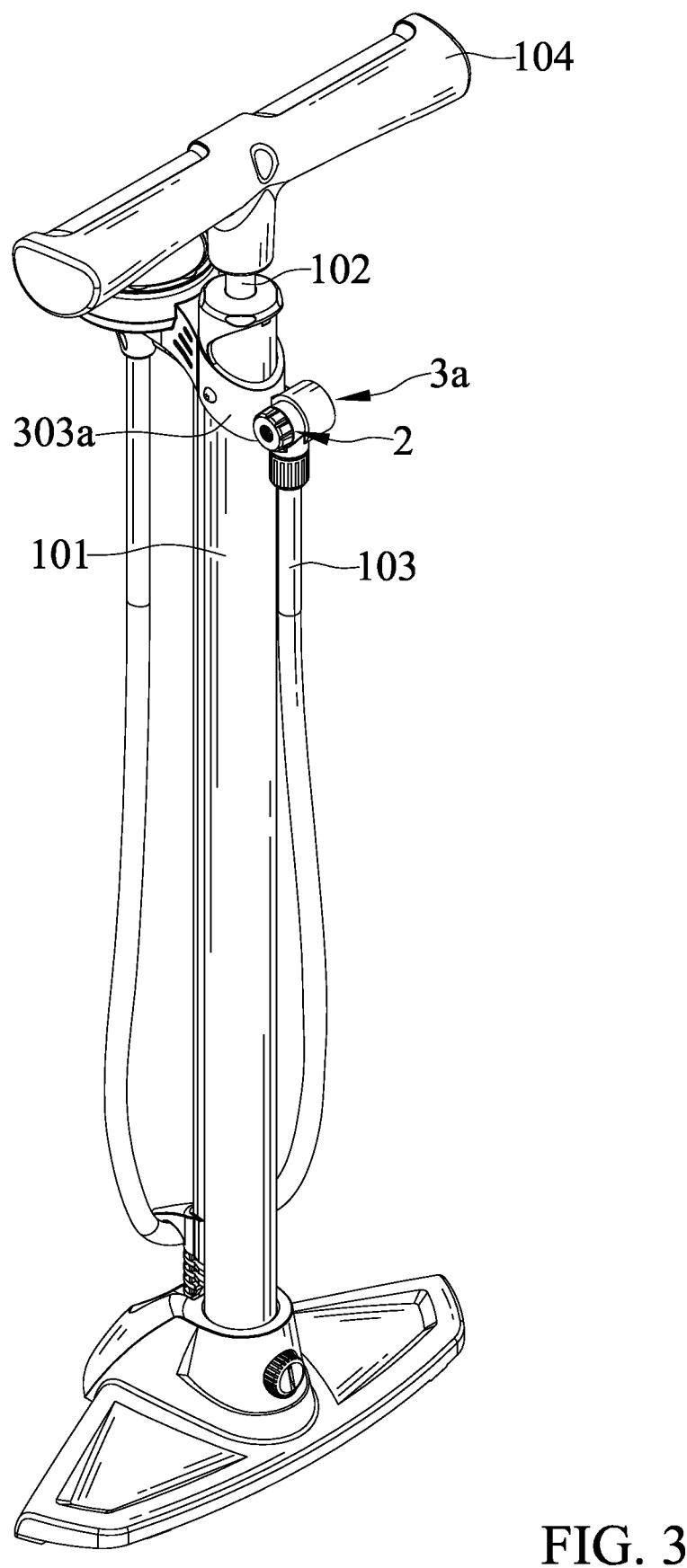
FIG. 3 is a perspective view of an inflating device in accordance with a second embodiment of the present invention.
Figure 4:
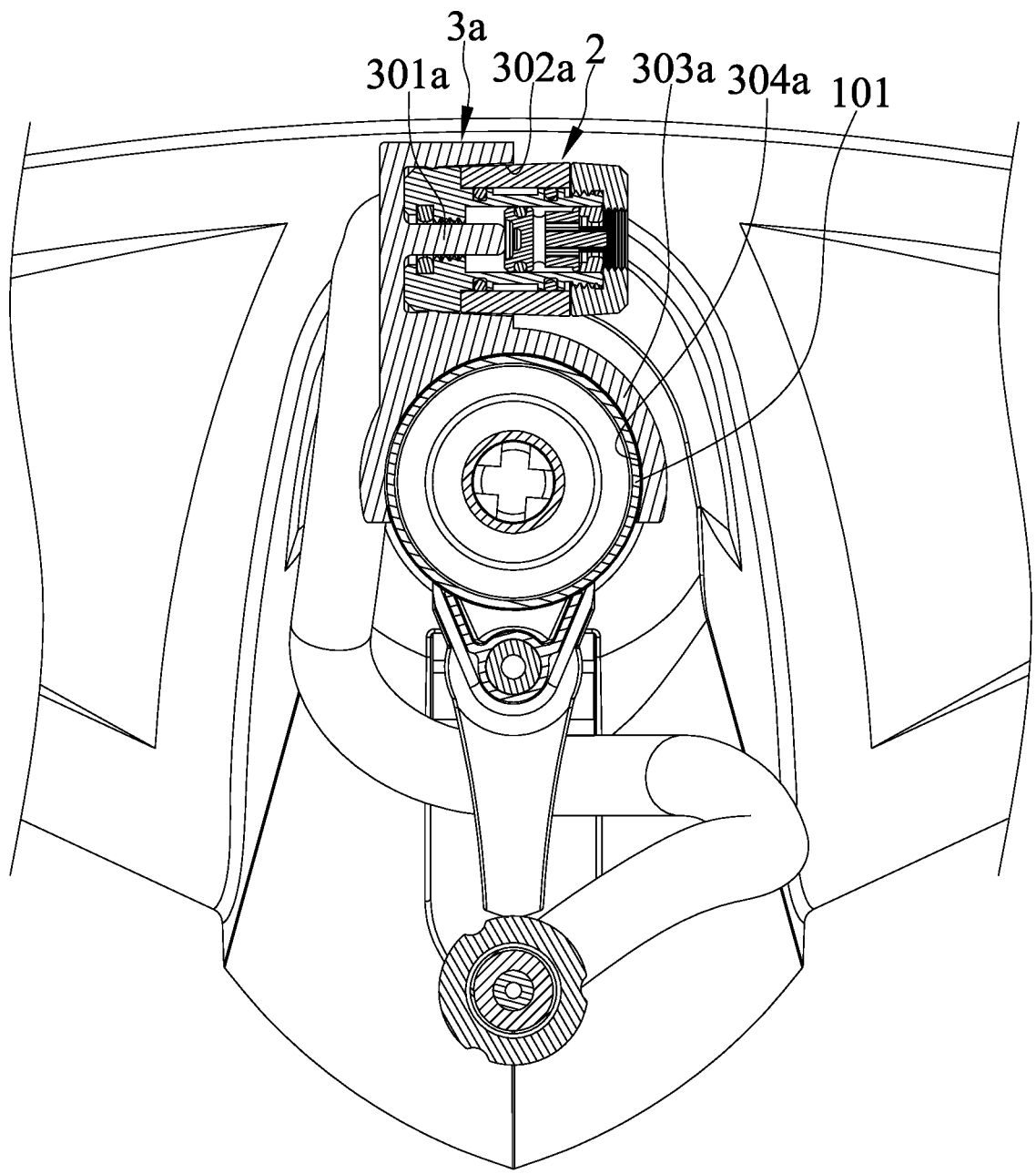
FIG. 4 is a partial, cross-sectional view of FIG. 3.
Figure 5:
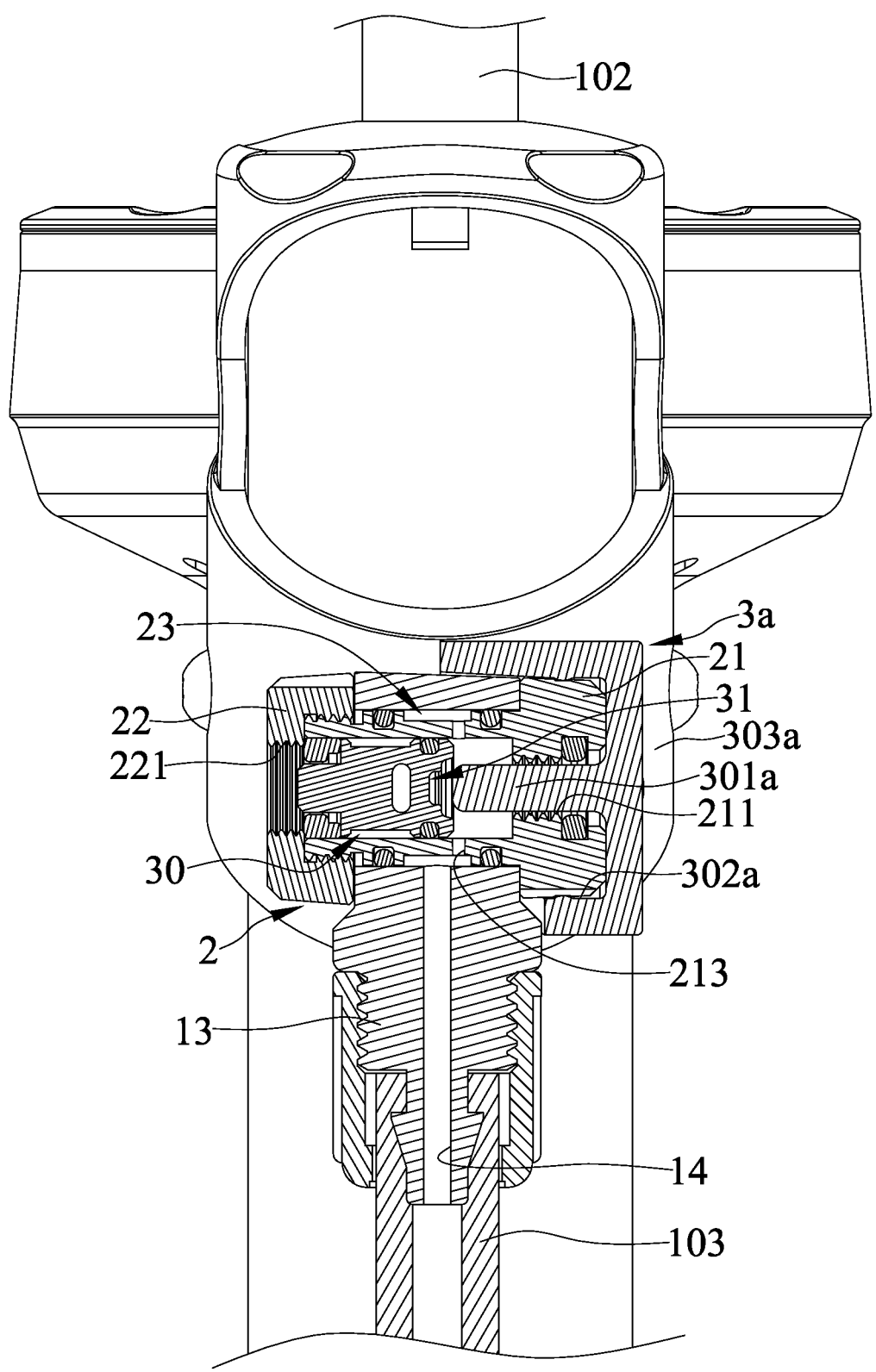
FIG. 5 is another partial, cross-sectional view of FIG. 3.

FIGS. 3 through 5 show an inflating device in accordance with a second embodiment of the present invention, and the same numbers are used to correlate similar components of the first embodiment. In this embodiment, the air pump 1 of the inflating device is a floor pump. The handle 104 of the air pump 1 is disposed adjacent to the top end of the cylinder 101 and so is a pushing apparatus 3*a*. The pushing apparatus 3*a* has a pushing portion 301*a* adapted to drive the valve seat 30. The pushing apparatus 3*a* delimits a holding space 302*a* in which the valve engaging head 2 is selectively inserted. The pushing apparatus 3*a* differentiates from the pushing apparatus 3 in that the pushing apparatus 3*a* has a connecting portion 303*a* connecting with and the cylinder 101. The connecting portion 303*a* is disposed on an outer periphery of the cylinder 101. The connection portion 303*a* has an inner arcuate surface 304*a* abutting against the outer periphery of the cylinder 101.

Figure 6:
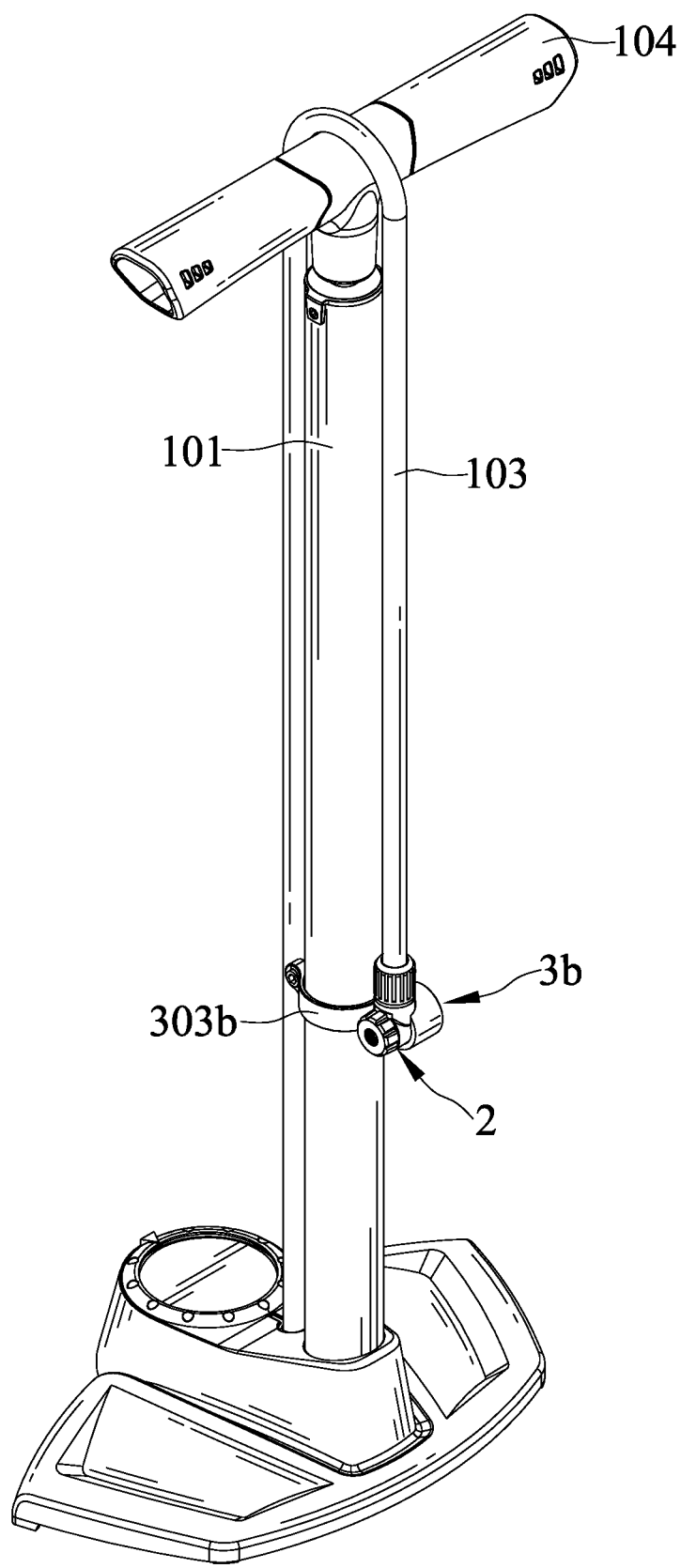
FIG. 6 is a perspective view of an inflating device in accordance with a third embodiment of the present invention.
Figure 7:
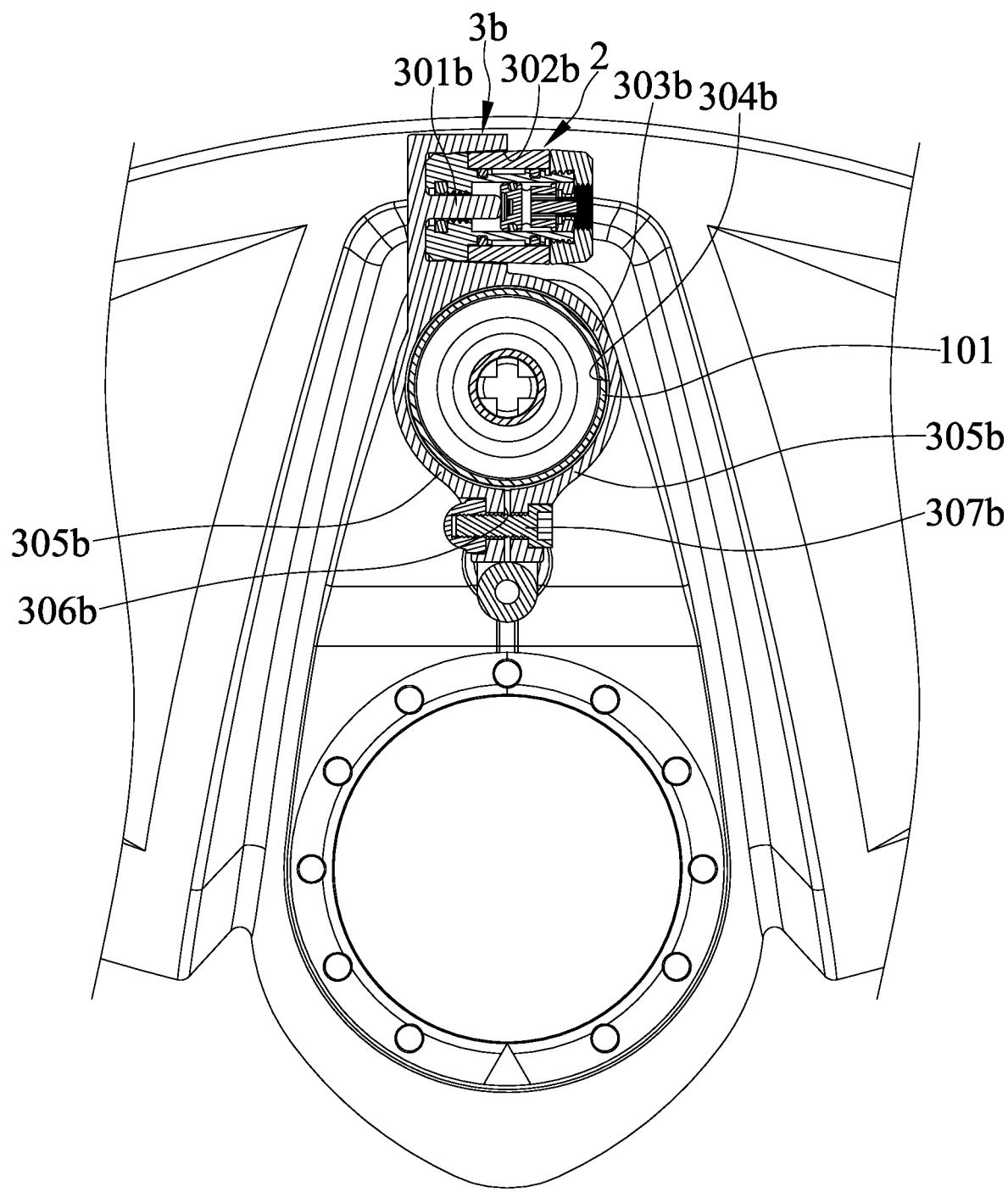
FIG. 7 is a partial, cross-sectional view of FIG. 6.
Figure 8:
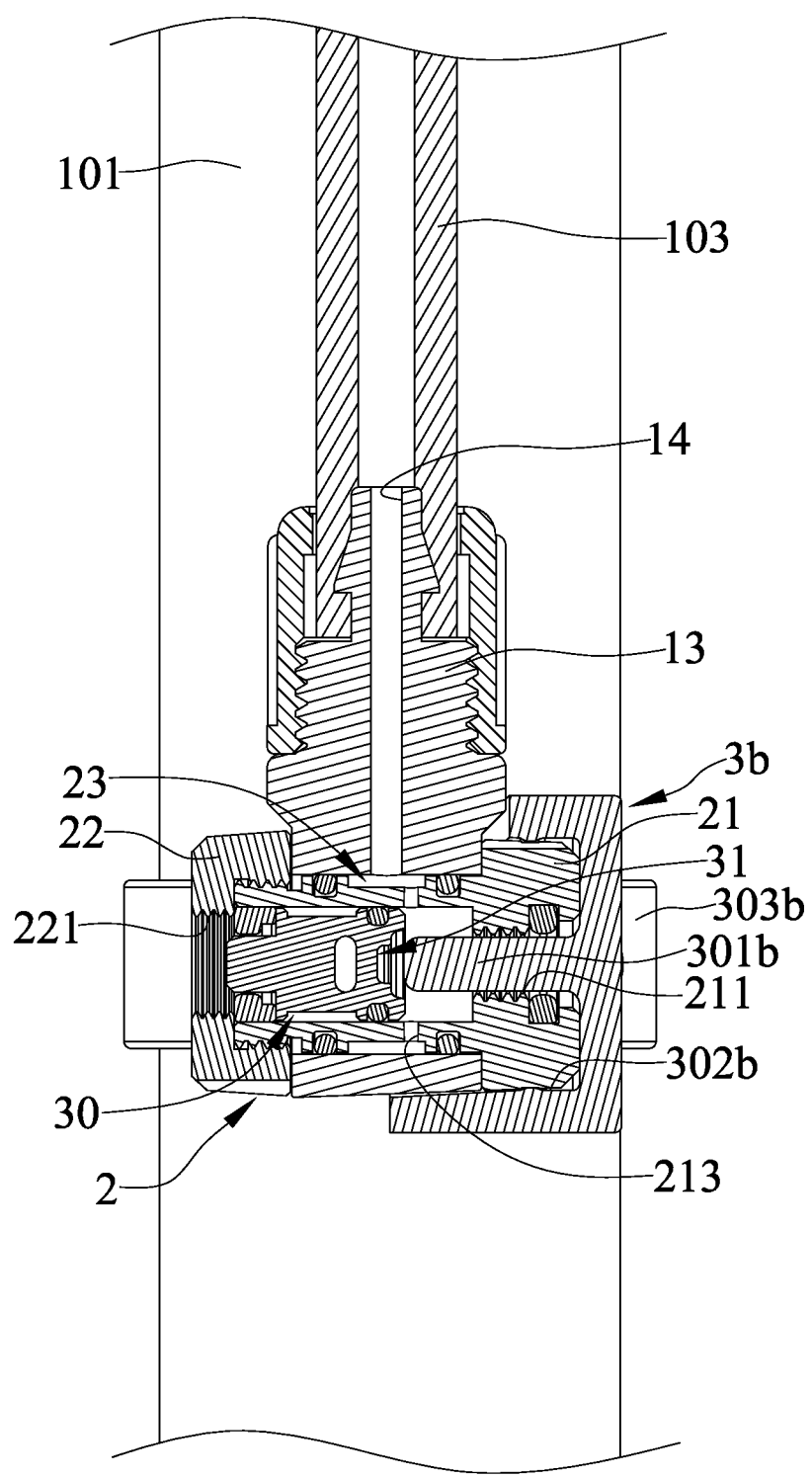
FIG. 8 is another partial, cross-sectional view of FIG. 6.

FIGS. 6 through 8 show an inflating device in accordance with a third embodiment of the present invention, and the same numbers are used to correlate similar components of the second embodiment. In this embodiment, the air pump 1 of the inflating device is a floor pump. The handle 104 of the air pump 1 is disposed adjacent to the top end of the cylinder 101. The pushing apparatus 3*b* has a pushing portion 301*b* adapted to drive the valve seat 30. The pushing apparatus 3*b* delimits a holding space 302*b* in which the valve engaging head 2 is selectively inserted. The pushing apparatus 3*a* differentiates from the pushing apparatus 3a in that the pushing apparatus 3b has a connecting portion 303b connecting with and the cylinder 101. The connecting portion 303b is disposed on an outer periphery of the cylinder 101. The connection portion 303b has an inner arcuate surface 304b abutting against the outer periphery of the cylinder 101. The connection portion 303b has two holding segments 305b which have first corresponding ends disposed separately. The first corresponding ends are separated by a gap 306b. The two holding segments 305b have second corresponding ends secured by a fastener 307b. The fastener 307b insert in the second corresponding ends.

In view of the foregoing, the inflating device includes the pushing apparatus 3, 3a, and 3b disposed on the air pump 1 and selectively engaging and disengaging the valve engaging head 2. Specifically, the pushing apparatus 3, 3a, and 3b selectively contacts and disengages from the connection assembly 20. The pushing apparatus 3, 3a, and 3b includes the pushing portion 301, 301a, and 301b adapted to drive the valve seat 30. When the pushing portion 301, 301a, and 301b pushes the first abutting portion 31, the valve seat 30 will move toward the second connection hole 221.

The foregoing is merely illustrative of the principles of this invention and various modifications can be made by those skilled in the art without departing from the scope and spirit of the invention.

What is claimed is:

1. An inflating device comprising:
   an air pump, wherein the air pump includes a cylinder, a plunger movably disposed in the cylinder and being reciprocally movable with respect thereto, and an air tube connected with the cylinder;
   a valve engaging head for engaging with a valve to be pumped intercommunicating with the air pump, wherein the valve engaging head includes a main body, a connection assembly coupled to the main body and having a first connection hole for connecting with a Presta valve and a second connection hole for connecting with a Schrader valve, and a valve seat movably disposed in the main body and having a first abutting portion against which a lock nut of the Presta valve abuts and a second abutting portion against which a valve core of the Schrader valve abuts, wherein the main body forms a head portion having a hole and the connection assembly is rotatably inserted in the hole, wherein the main body forms a body portion extending from the head portion and having a through hole which extends therein and intercommunicates with the hole and the air tube, wherein the connection assembly has a receiving hole and the valve seat is movably disposed in the receiving hole, and wherein the receiving hole intercommunicates with the first and second connection holes; and
   a pushing apparatus disposed on the air pump and selectively engaging and disengaging the valve engaging head, wherein the pushing apparatus selectively contacts and disengages from the connection assembly, wherein the pushing apparatus has a pushing portion adapted to drive the valve seat, and wherein the pushing apparatus engaging with the valve engaging head includes the pushing portion entering the receiving hole via the first connection hole and pushing the first abutting portion, thereby driving the valve seat toward the second connection hole.

2. The inflating device as claimed in claim 1, wherein the connection assembly includes a first connection member and a second connection member connected with the first connection member, wherein the first connection hole and the receiving hole extend in the first connection member, and wherein the second connection hole extends in the second connection member.

3. The inflating device as claimed in claim 2, wherein the first and the second connection members are releasably engaged with each other.

4. The inflating device as claimed in claim 3, wherein the first and the second connection members are in thread engagement.

5. The inflating device as claimed in claim 2, wherein the connection assembly has an air passage which extends between an inner periphery of the hole and an outer periphery of the first connection member, wherein the first connection member has an air vent which extends radially therethrough and intercommunicates with the air passage, and wherein the air vent intercommunicates the through hole.

6. The inflating device as claimed in claim 5, wherein the valve seat has an outer periphery including an airtight ring mounted thereon, and wherein the airtight ring abuts against an inner periphery of the receiving hole.

7. The inflating device as claimed in claim 6, wherein the airtight ring is located between the air vent and the second connection hole when the valve seat is disposed adjacent to the second connection hole.

8. The inflating device as claimed in claim 7, wherein the first connection member has a first shoulder which delimits a distal end of the receiving hole and extends radially between inner peripheries of the receiving hole and the first connection hole, and wherein the second connection member has a second shoulder which extends radially and abuts against a distal end of the first connection member.

9. The inflating device as claimed in claim 8, wherein the second abutting portion includes an airtight sleeve mounted therearound and abutting against the inner periphery of the receiving hole, and wherein the valve seat is movable to a first position in which the first abutting portion abuts against the first shoulder and a second position in which the airtight sleeve abuts against the second shoulder.

10. The inflating device as claimed in claim 5, wherein the first connection member includes two seal rings mounted therearound and abutting against the inner periphery of the hole, wherein the first connection member has two annular grooves retaining the two seal rings, wherein the two annular grooves extend between the inner periphery of the hole and the outer periphery of the first connection member, and wherein the air passage is disposed between the two annular grooves.

11. The inflating device as claimed in claim 8, wherein the first connection member has a large diameter section and a small diameter section, wherein the large diameter section is disposed outside the hole, wherein the small diameter section extends through the hole, wherein the second connection member is mounted on the small diameter section, wherein the first connection hole extends in the large diameter section, and wherein the receiving hole extends in the small diameter section.

12. The inflating device as claimed in claim 1, wherein the pushing apparatus delimits a holding space in which the valve engaging head is selectively inserted, and wherein the pushing portion extends in the holding space.

13. The inflating device as claimed in claim 12, wherein the pushing portion extends from an inner periphery of the holding space, and wherein the pushing portion extends outside the holding space.

14. The inflating device as claimed in claim 1, wherein the pushing apparatus is coupled to the plunger, and wherein the pushing apparatus is also coupled to a handle of the air pump that is adapted to be gripped and moved reciprocally with the plunger upon the operation of the air pump.

15. The inflating device as claimed in claim 14, wherein the handle is pivotally coupled to the pushing apparatus.

16. The inflating device as claimed in claim 14, wherein the pushing apparatus has a connecting portion connecting with the plunger, and wherein the connecting portion and the plunger are in thread engagement.

17. The inflating device as claimed in claim 1, wherein the pushing apparatus has a connecting portion connecting with and the cylinder, and wherein the connecting portion is disposed on an outer periphery of the cylinder.

18. The inflating device as claimed in claim 17, wherein the connection portion has an inner arcuate surface abutting against the outer periphery of the cylinder.

19. The inflating device as claimed in claim 18, wherein the connection portion has two holding segments which have first corresponding ends disposed separately, and wherein the first corresponding ends are separated by a gap.

20. The inflating device as claimed in claim 19, wherein the two holding segments have second corresponding ends secured by a fastener, and wherein the fastener insert in the second corresponding ends.

* * * * *